United States Patent [19]

Dethloff

[11] 4,105,156

[45] Aug. 8, 1978

[54] IDENTIFICATION SYSTEM SAFEGUARDED AGAINST MISUSE

[76] Inventor: Jurgen Dethloff, Elbchaussee 239, Hamburg, Fed. Rep. of Germany

[21] Appl. No.: 751,035

[22] Filed: Dec. 16, 1976

[30] Foreign Application Priority Data

Sep. 6, 1976 [AT] Austria ................................ 6599/76

[51] Int. Cl.² ........................ G06K 19/06; G06K 7/06
[52] U.S. Cl. ..................................... 235/441; 235/487; 235/492
[58] Field of Search ............... 235/487, 492, 441, 380, 235/492, 400, 401, 402, 403; 200/46; 250/569; 340/149 R, 149 A, 152; 360/2; 194/4 R

[56] References Cited

U.S. PATENT DOCUMENTS

| | | | |
|---|---|---|---|
| 3,641,499 | 2/1972 | Housman | 235/492 |
| 3,702,464 | 11/1972 | Castrucci | 235/492 |
| 3,868,057 | 2/1975 | Chavez | 235/492 |
| 3,906,460 | 9/1975 | Halpern | 235/439 |
| 3,934,122 | 1/1976 | Riccitelli | 235/492 |
| 4,001,550 | 1/1977 | Schatz | 235/487 |
| 4,004,133 | 1/1977 | Hannan | 235/492 |
| 4,007,355 | 2/1977 | Moreno | 340/149 A |

*Primary Examiner*—Robert M. Kilgore
*Attorney, Agent, or Firm*—McGlew and Tuttle

[57] ABSTRACT

An identification card with interior circuits, including memory means, for use in a credit or identification system, into which the user enters a "secret" number and then the input gate to that part of the memory means is destroyed for security purposes.

27 Claims, 8 Drawing Figures

IDENTIFICATION SYSTEM SAFEGUARDED AGAINST MISUSE

FIELD AND BACKGROUND OF THE INVENTION

This invention relates to a security system which protects against misuse and counterfeiting associated with banking transactions in particular, such as manual or automatic dispensing of money, by using identificands, such as credit cards, check cards, machine-read cards and the like, which bear identification and card use data which can be read visually and by machine, and by utilizing an individual distinguishing device, such as a personal identification number (PIN), to check whether the user is entitled to use the identificand.

As the system of the invention is not limited to the use of a card, but can also employ a key, a coded token, or the like, the generic term "identificand" consequently is used hereinafter for the element usable with the system, and includes either a card of the mentioned type, a coded token, or a key, or the like.

In systems of this general type, the intention is to protect the identificand from misuse and counterfeiting, and such systems have been the subject of many previous proposals, patented and otherwise. Thus, some known systems of cash dispensing may use, for example, the account number as an identification and, for protection, a personal reference number or personal identification number which correlates with the account number. The user has to insert his card into a verifying means, such as a machine, and "key in" his personal reference number (PIN) in order to prove or check his right to use the identificand. Obviously, in such a case, evidence of tampering cannot be checked, so that it is easy for a potential criminal to counterfeit cards if he is able to decipher the correlation between the account number and the identification number. Deciphering is made easier by the fact that, in all known machine cards, the personal identification number (PIN) entered on the identificand can be easily determined either visually or by machine reading, regardless of whether it is encoded or printed.

Moreover, the identificands carry still other data which might be of interest to a criminal, namely, use data. Use data includes the expiration time or date, the amount of money available to the rightful owner of the identificand, such as a card, and the conditions of use of the identificand. Not only the rightful owner of the card, but also a potential criminal, can easily change, to his or her advantage, this use data, especially if the use data is recorded on a magnetic strip, known to the art as "magstrip", on the card, such magstrips being characteristic of machine-read cards only.

While the state of this art is contained in volumes of technical literature, it is sufficient to mention, in particular, German Offenlegungsschrift No. 1,945,777, U.S. Pat. Nos. 3,891,830, 3,868,057, 3,934,122, and 3,702,464, and also British Patent No. 1,197,183. All the machine-read cards covered by the prior art technical literature, however, have the disadvantage that the personal identification number (PIN), even if not always easily deciphered, can be determined, and furthermore, the machine-read cards can also be misused by the rightful owner by changing the use data. In other words, the information contained in these cards is externally accessible to either the rightful owner or to a potential criminal.

SUMMARY OF THE INVENTION

Accordingly, the objective of the invention is to provide a security system safeguarded against misuse and counterfeiting, especially in the processing of banking transactions, where the known disadvantages, mentioned above, are eliminated. It is a further objective of the invention to permit the identificand to be used for both machine-read and conventional applications.

In accordance with the foregoing, the basic or underlying concept of the present invention is that all or part of the information to be stored in the identificand, and which is to be protected against misuse or counterfeiting, is fed into memories which can be loaded only one time and permanently and, in addition, the fed-in information cannot be determined from outside the identificand or, in other words, is not accessible externally. In order to be able to utilize these identificands, the identificands further include internal memories and means to compare data, transmitted from the exterior, with the stored data, and which are readable only within the identificand, for example, for the purpose of checking identity and right of use or entitlement. In identificands embodying the invention and for use with machines, there are included, in the identificand, further memories and circuitry elements which make possible communication with the machine, for example, through input-/output devices for connection to the machine either electrically, magnetically, or otherwise.

It is known from the prior art that memories have been developed in which only one entry can be made and from which nothing can be erased. However, such memories can and must be readable from outside (see U.S. Pat. No. 3,702,464 covering a ROS MEMORY). With the present invention, the system and the data protected in the identificand cannot be determined from the exterior and so the system does not require further secrecy measures. With the present invention, the potential criminal, or the rightful user attempting to misuse the identificand, may know all the specifics, but still will not be able to misuse the identificand or to break into the system with success.

As the invention requires a number of memories and control circuits, it is practical to combine all of these elements into one integrated circuit (IC) or "chip" incorporated in the identificand. Such integrated circuits, moreover, increase protection against tampering with the identificands themselves since, without considerable difficulty and expense, a criminal would hardly be able to determine the layout of an IC and copy it.

As a further security measure, the invention assures that, when the identificand is first initialized, for example, by assigning a "neutral" identificand to a client through entering the account number and a personal identification designation, such as a personal identification number (PIN), no misuse is possible. Prior to this, during manufacture, a protective code is entered into the identificand, and this code can be read only under certain conditions, and only once. Additionally, as an essential feature, the client is free to select his own personal identification number (PIN), and this number can then be completely independent of other data in the identificand.

The system of the invention has many advantages over current systems and current cards. Thus, the system of the invention permits conventional as well as machine-read cards to be used. Furthermore, misuse of the system, by modifying or changing the use data, is as impossible by the rightful owner of the card as by an unauthorized person. As the user himself is free to determine his own personal identification number (PIN), there is no need for additional safeguards in the system in order to maintain assigned code numbers secret. Furthermore, an identification card of the system of the present invention can be used with checking facilities used with existing credit cards as well as being used with detection or authenticity checking apparatus developed by the present inventor.

In checking the identificand, there are three things to be checked:

(1) whether the user is identical with the rightful owner of the card;

(2) whether the account number has been altered in any respect; and (3) whether or not the card is an authorized card.

This third check results inherently from the first and second checks. The three checks can be made with a device which is about the size, weight and cost of an ordinary pocket-type electronic calculator, such as presently in widespread use.

An object of the invention is to provide an improved security system protecting, against misuse and counterfeiting associated with banking transactions in particular.

Another object of the invention is to provide such a security system eliminating the known disadvantages of known security systems.

A further object of the invention is to provide such a security system in which the identificand can be used for both machine-read and conventional applications.

For an understanding of the principles of the invention, reference is made to the following description of typical embodiments thereof as illustrated in the accompanying drawings.

BRIEF DESCRIPTION OF THE DRAWINGS

In the Drawings:

FIG. 1 is a somewhat diagrammatic plan view of an identificand, used with the system of the invention, in the form of a card or the like;

DETAILED DESCRIPTION OF THE PREFERRED EMBODIMENTS

Figure 1:
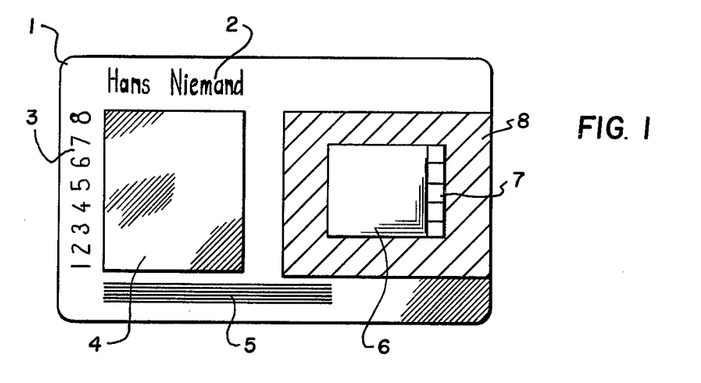

Referring first to FIG. 1, this figure shows an identificand 1 designed to be a credit card or Eurocheque card. The identificand 1 carries, in the area 2, the name of the owner, in the area 3, printed identification or account numbers, in the area 4, a photo of the owner, and, in the area 5, the signature of the owner. The area 3 is planned for a shorter side of the card so that the account number remains readable when the card is introduced into a verifier or checking device.

In addition, the card 1 comprises an integrated circuit (IC) in area 6 and, in area 7, internal connectors for the power supply, as well as for data input and output. The integrated circuit or IC is invisibly implanted in the card, as by being enclosed between outer layers of plastic or the like, such construction of cards with an inner information-carrying layer and outer closing layers of plastic or the like being well-known to those skilled in the art.

A certain area surrounding the IC, indicated at 8, is maintained free of conductive material so that, when the card is introduced into a machine verifier, checks can be made as to whether or not there are connections to the circuitry of the card from a simulated circuit outside the machine. As the total counterfeiting of a card with an identical IC cannot be regarded as feasible, in view of the high financial investment, known-how requirements and risk conditions, this step serves to prevent a potential criminal, even if he knows the manner in which the IC operates, from constructing a substitute circuit from discrete components and connecting such substitute circuit, for example, with wires, to a card which, in this instance, works as an adapter. The machine furthermore checks whether connections of other kinds have been made across the area 8 or the like surrounding the integrated circuit or IC.

Figure 2:
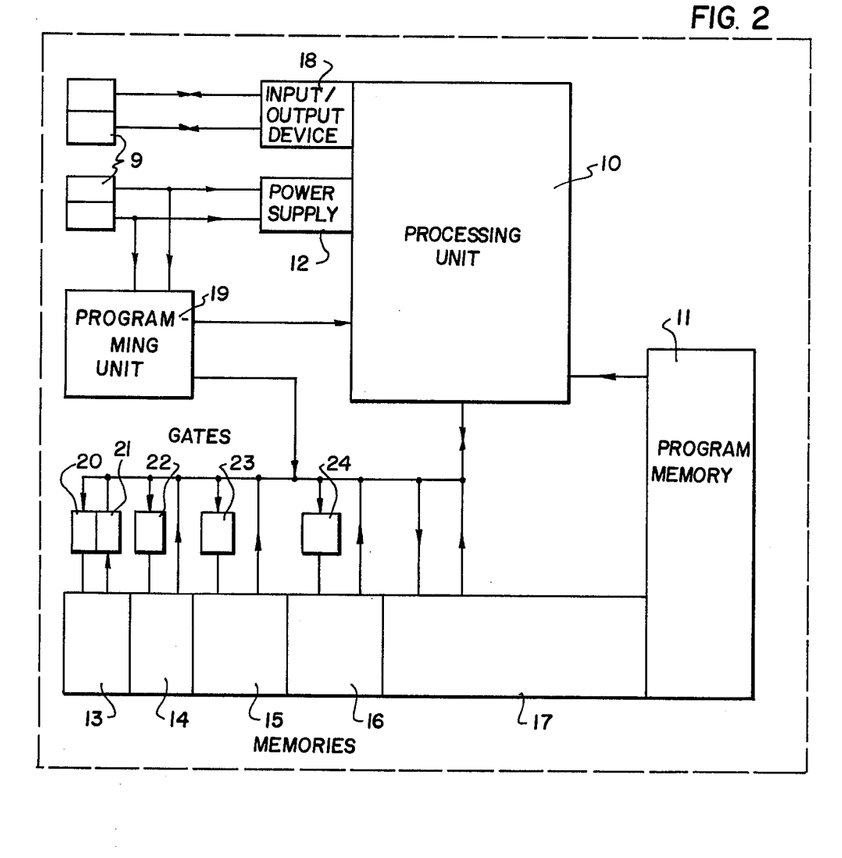
FIG. 2 is a block diagram of the integrated circuit (IC) of the identificand shown in FIG. 1.

FIG. 2 is a block diagram of the IC 6, and all the individual parts illustrated in FIG. 2 are actually integrated into one monolithic circuit, such as the well-known "chip". The power supply and the data input and output are fed through connectors 9, which may be either galvanic-type connectors or inductive-type connectors. If the feed is inductive, the connectors 9 are supplemented by the necessary converters.

The integrated circuit, or IC, comprises the processing unit (PU) 10, which is a special microprocessor, which is controlled by a predetermined program stored in program memory 11. The PU 10 and the program memory 11 may, in a modification, be hard wired logic within the integrated circuit.

The power is fed through integrated power supply 12, in which the outside power is converted into electrical values necessary for operation of PU 10. A consistently high outside power supply is essential for the programming unit 19 of the IC to be able to program the memories 13 through 17. For this reason, a check is made, in power supply unit 12, as to whether the power supply is high enough to activate PU 10 consistently, and whether such power supply is indeed sufficient to destroy the IC in the case of cards which have been programmed to self-destruct when misused. When the power supply is too low, the IC will not operate.

The self-destruct device in the IC can, for example, be implemented by switching changes in the programming of gate 24. Normally, this gate remains open, and the use data can be read from memory 16. If, during the process of identification checking, it becomes necessary to bar use of the identificand, gate 24 will be closed automatically so that use data can no longer be read. PU 10 will, for example, operate only when use data can be read.

The self-destruct effect can be triggered by the card itself through a corresponding control of the program memory 11, as well as through a triggering signal from the exterior. In machine-read cards, such a triggering signal can be generated by the machine when additional checks in the machine demand such destruction.

All data input and output occurs through the input/output unit or device 18. PU 10 is programmed to perform all of the functions described above. When the supply voltage is applied from the outside, the microprocessor of PU 10 starts running automatically and checks, as a first step, whether the supply voltage is high enough.

After this, PU 10 performs further functions through data input, and which will be described later. After checking the personal identification number (PIN) and other information, the output of return signals is supplied through input/output unit or device 18.

All the parts of the IC described above are integrated in one piece or "chip" during manufacture. The required memory units 13 through 17 are PROMs (Programmable Read Only Memories) and, during manufacture, can be integrated into the IC either as a whole or in parts, or can be preformed as separate ICs.

These PROMs are fed various data at different times in the steps described hereinafter, to create a personalized identification card from a "neutral" one. The memories 13 through 17 are treated in various ways. Some can be programmed only through gates 20 through 24. These programming-block circuits can be activated so that no later changes to the contents of these memories can be made. The memories differ individually as to their readability, for example, only certain predetermined memories can be read from the outside of the card and others cannot be read from outside the card. When, why and which parts are programmable or readable is explained hereinafter.

As already stated, the memory part of the integrated circuit or IC comprises the memories 13 through 17. Memory 13 contains the protective code safeguarding the card on its way between the factory and the place of issuance, and is programmable only as long as gate 20 is open and can be read only internally, through gate 21.

Memory 14 stores the personal reference number (PIN), which can be entered only when gate 22 is open. This number cannot be read from the card, but can be made available in PU 10 for comparison purposes.

Memory 15 stores data for the identification of the respective card or the account owner. Into memory 15, there is fed the account number, or other information, including alpha-numerical information, for the identification of the account number. It is only after such programming that the identificand is correlated to the individual client. This part of the memory is programmable only when gate 23 is open and, after programming, gate 23 is destroyed or made inoperable. Despite this, memory 15 remains readable to PU 10.

Memory 16 stores use data, such as the length of the time period, the limit of the period, and per diem limits. This data can be entered through gate 24 only at the time the card is issued, for example, at initializing of the card.

Into memory 17, there is stored, for each use data, such as calendar date, number of mistrials allowed for input of the personal reference number or PIN, account transactions, etc.

The entire procedure of initializing and using the card will now be described, using, as an example, a monetary application.

The last step in manufacture of the card is to enter, into memory 13, a protective code in the form of a numeral, created in a random generator. At the same time, this protective code is printed on a separate slip. After the protective code input, gate 20 is destroyed so that a change of the protective code, or entering of another digit into memory 13, is no longer possible. The printed slip is secretly and automatically sealed into an envelope. The cards and envelopes are stored and handled separately. Up to this point, the cards are still "neutral". Upon issuance of a card to a customer, the "neutral" card is "married" to the envelope bearing the same serial number on the outside. Then the envelope is opened, preferably by the customer himself, and the visually readable protective code is learned.

The card is then introduced into the coding device or encoder at the place of issuance, so that the data specific to the customer can be entered. To effect this, the customer first enters the protective code number, through the input/output unit or device 18, into PU 10, where a comparison is made with the protective code stored in memory 13. If the result is negative, then, after a predetermined number of negative trials, self-destruction of the IC is triggered. If the result is positive, then the IC 6 transmits a "go" signal to the encoder so that the other data can be entered.

Initially, the client or customer secretly enters the personal reference number or PIN which he himself has chosen, and which is then again transferred to PU 10 and from there is stored in memory 14 through gate 22. After such storing, gate 22 is automatically destroyed so that the PIN cannot be changed.

Following this, the data to be used for the identification of the client or customer is fed into the IC. Thus, the account number of the client is fed into memory 15 through gate 23, after which gate 23 is automatically destroyed so that this data cannot be changed.

The conditions of use are fed into memory 16 through gate 24, and gate 24 is thereafter automatically destroyed. As a last step, the account start-up status can be fed into memory 17. After storage of this last data, output gate 21 of memory 13 is destroyed so that the card cannot be initialized a second time with the protective code, since a check of such protective code is no longer possible. The card is now ready to hand over to the client or customer.

Figure 3:
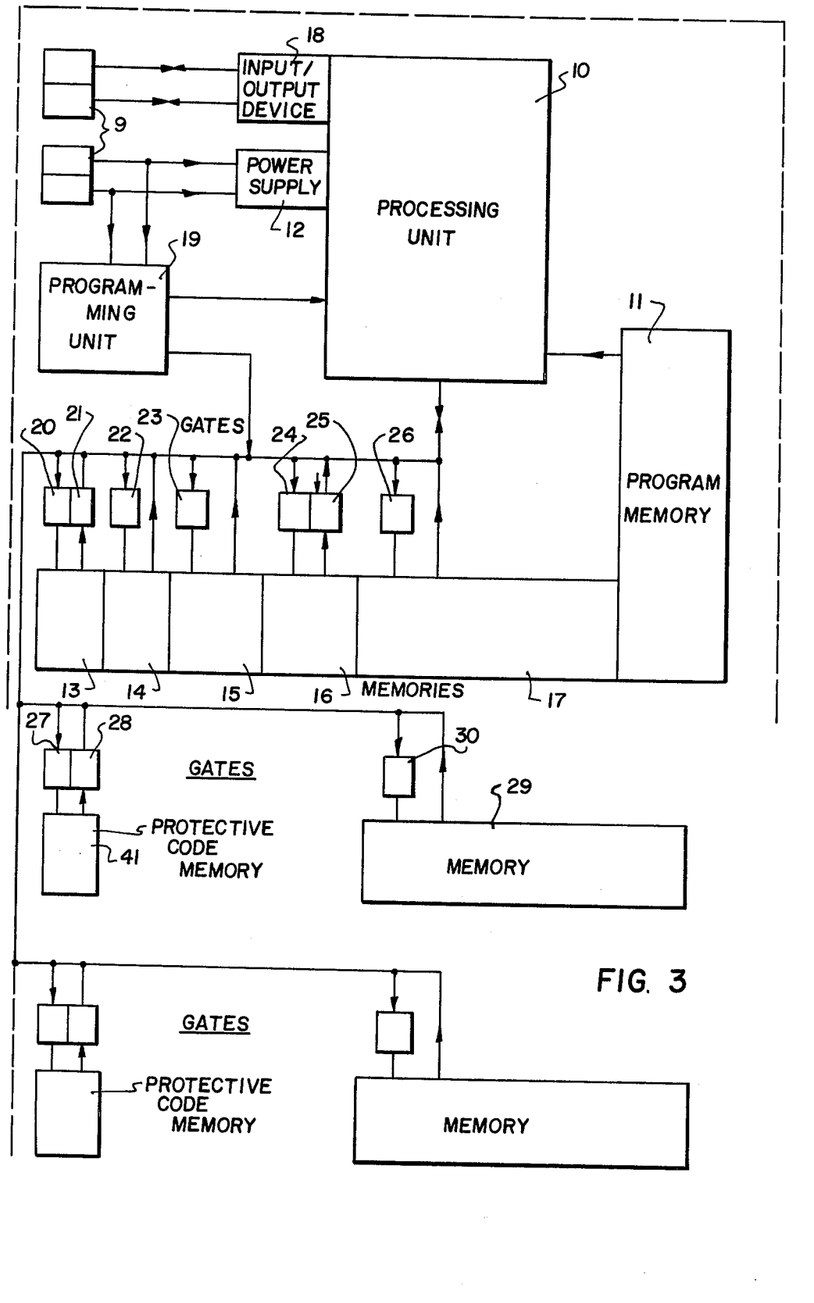
FIG. 3 is a block diagram of the IC shown in FIG. 1 expanded to include further integrated circuitry.

If, after expiration, a card is to be revalidated by being reinitialized, further protective codes are available which will be treated in a like manner. Thus, memory 13, together with gates 20 and 21, is provided several times, or is multiplicated. When the time limit for a card has expired, or the amount of money or credit has been used up, the client goes to his bank with the card. The bank may hold, in addition to the first envelope, more sealed envelopes correlated to the customer's card, and which contain a second, third, etc., protective code. This arrangement is shown in FIG. 3.

The card is now, as already described in connection with the first protective code, initialized again after the input of the second protective code. At such second initializing, gate 26 is destroyed so that no further data can be entered in the first transaction memory 17.

Now, gate 30 is opened by special programming so that transactions can be entered into "Account 2", memory 29 through gate 30. Gates 27 and 28 correspond, in their functions, to gates 20 and 21, and the protective code-memory 41 corresponds to the protective code-memory 13. The second and all further protective code memories are programmed, during the last step of manufacture, with protective code 2, code 3, etc. This extension of further protective codes and further account memories allows for a longer life and more economical utilization of the electronic parts of the card.

To use the card, it is introduced into the reader, verifier or machine, where the supply voltage is initially checked as to needed value, particularly as to the possibility of self-destruction of the IC, if this is required.

Verification of the user as to his ownership/user identity is effected through input of the personal reference number or PIN and comparison thereof with the PIN stored in PU 10. The PIN thus cannot be read from outside. If the feedback is positive, the account number can be checked next, whereby, at the nth mistrial, the IC is automatically destroyed. In addition, the number of mistrials is entered on the card.

With conventional cards, the account number is printed on the face of the card so that it can be read and then fed into the checking device. However, with the present invention, the checking of the account number takes place in the IC of the card itself. In this check, with the present invention, at the nth mistrial, an alarm is triggered since one has to assume that the account number printed on the card has been changed to effect, for example, a debit to a different account. Here again, the number of mistrials will be recorded.

In addition to, and/or in combination with, the aforementioned checks, further verification measures are taken, which require an arrangement of the function and/or memory circuits, and which cannot be carried out by conventional integrated circuits, that is, which have not been designed for this particular purpose. This prevents criminals from simulating a "go" signal by using conventional ICs in a counterfeit card without going through the above-mentioned additional checks.

After completion of all of these checks, the operation itself can be started, for example, dispensing of money. If the desired transaction is not allowed because the credit limit would be exceeded, that is, that too much money has been requested, the customer will automatically receive appropriate messages. The check as to whether a transaction is allowed or not is effected in PU 10. If the account number on the card is also to be readable by the verifying machine, program memory 11 has to contain a corresponding program.

The recording of transactions is effected in memory 17, by accumulating all transactions in succession, so that a reading can be taken at any time. Since the old transaction balances cannot be erased when new entries are made, the entire listing of the account is available. Thus, account statements can be prepared.

The invention is neither limited to banking transactions nor limited to the utilization of identificands in the form of cards. Thus, through the invention system, for example, entry into restricted areas can be protected by admitting only predetermined persons who bear genuine, valid and unfalsified identificands, thereby, proving themselves the rightful owners of these identificands.

Furthermore, the identificands can be utilized to permit physical access to installations only by entitled persons, or to give certain personnel authorized access to information (data) for storage or retrieval purposes.

A special advantage is that, since use data is stored in an unalterable way, users are given prescribed boundaries to enable the system to be used in any potential "off-line" applications.

Figure 4:
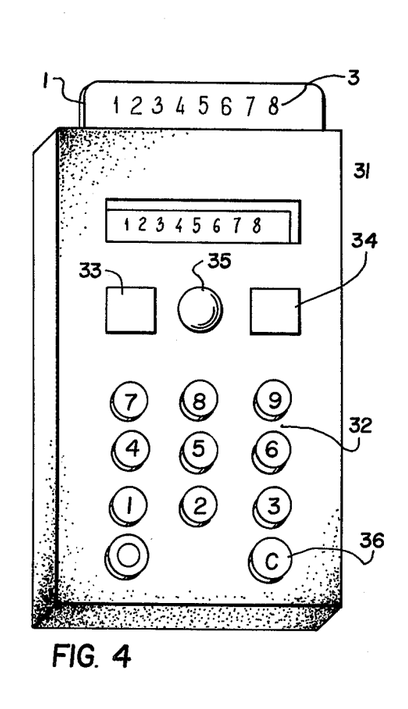
FIGS. 4 and 5 are perspective views of simple checking devices or verifiers usable with the identificand of the invention system.
Figure 5:
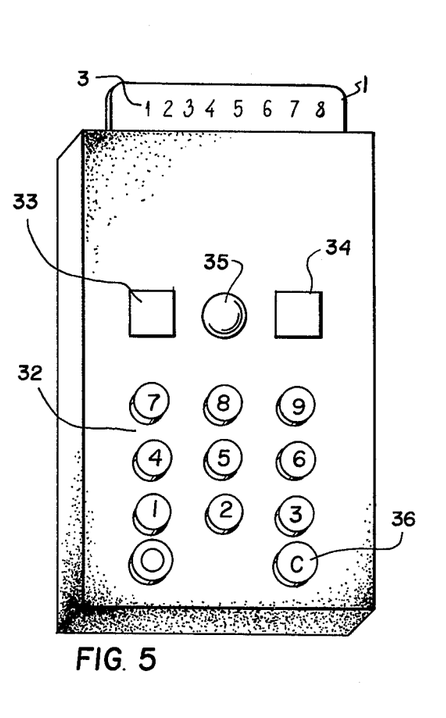

FIGS. 4 and 5 illustrate two examples of a simple checking device for verifying identificands using the system of the present invention, and which identificands work in the same manner as Eurocheque cards or credit cards. These simplified checking devices, shown in FIGS. 4 and 5, check the identity of the user/owner and determine whether the account nuumber, printed on the outside, has been modified or not. The devices generally check the legitimacy of the card which, by implication, check whether or not the necessary IC is installed therein.

The two illustrated devices differ only in the display 31 of the device shown in FIG. 4 and which, by comparing the identification/account numbers, displays the number read automatically from the card so that it can be checked visually against the account number 3 printed on an exposed portion of the card 1. In the example shown in FIG. 5, there is no display 31 of the account number.

The checking operation, which compares the number printed on the outside of the card 1, and which, in this case, is manually entered on keyboard 32 by the clerk, is effected internally in the card through IC 6. Depending on the result of the comparison, IC 6 transmits a signal to the checking device, such as a verifier or reader, indicating "go" or "correct" in position 33, or "alarm" or "incorrect" in position 34.

The signals in positions 33 and 34 serve, in the same way, to compare the personal reference number or PIN. Switch 35 puts the device into operation, while erase key 36 terminates check entries or wrong inputs.

In the simple identificand check which is possible with the verifying means shown in FIGS. 4 and 5, the IC could be made to self-destruct after a predetermined number of mistrials in the input of the personal identification number (PIN) or the identification/account number. The electrical power required for such a self-destruct mechanism is available in the checking device or verifying means.

Figures 6, 8:
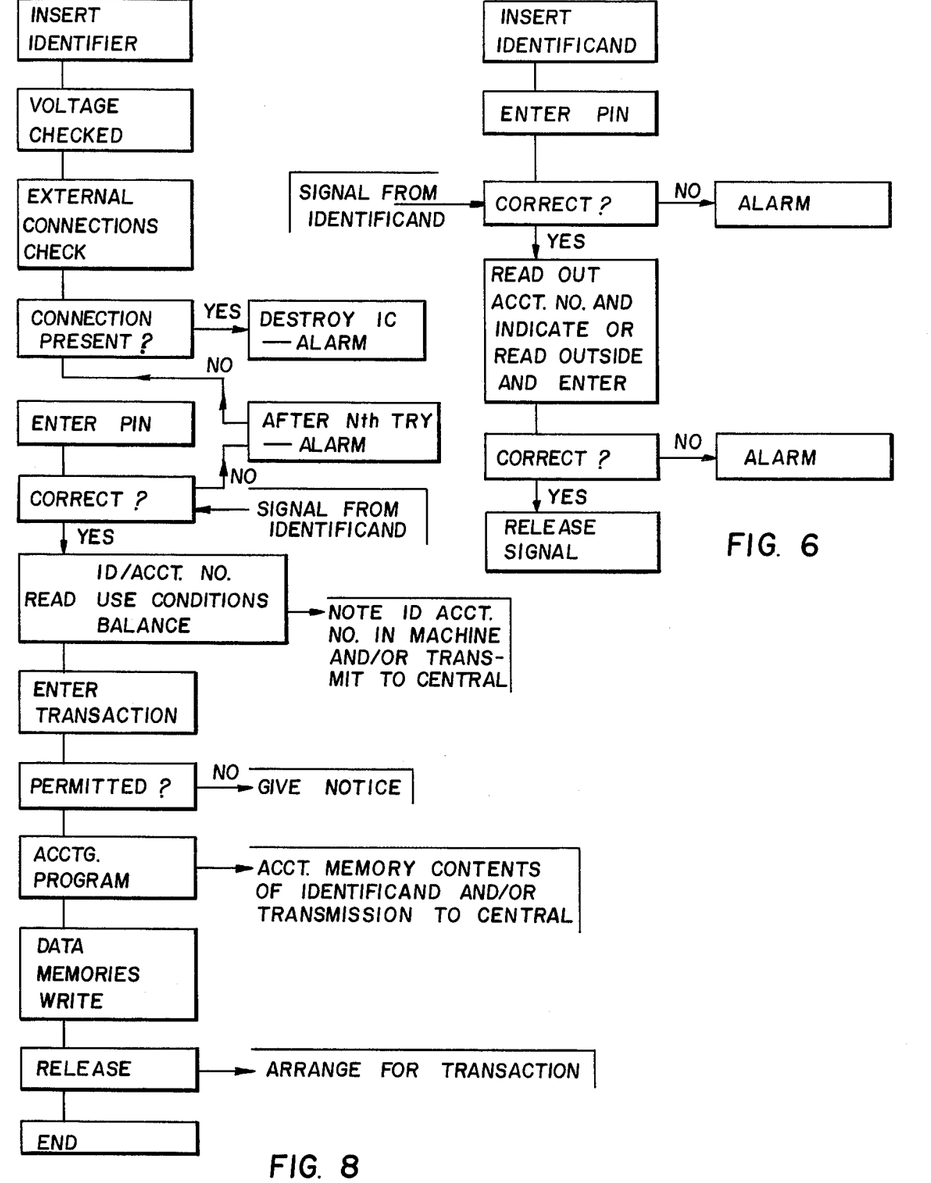
FIG. 6 is a flow chart of the checking of identificands.
FIG. 8 is a flow chart of the machine checking process, related to FIG. 7.

With reference to the verifying devices shown in FIGS. 4 and 5, FIG. 6 is a self-explanatory flow chart illustrating the checking of identificands as applied in the case of conventional credit or Eurocheque cards, or other non-machine uses. Thus, the identificand is introuduced into the checking device or verifying means and the PIN is entered in the checking device. A signal from the identificand IC then indicates whether the PIN is correct or not. If incorrect, an alarm is provided. If correct, a "go" signal is provided.

The account or identification number, entered into the checking device, is then readout from the IC of the identificand to provide either a "correct" or "yes" signal or a "incorrect" or "no" signal. In the latter case, an alarm is given. In the former case, if there is a "yes" or "correct" signal, a release signal is provided.

Figure 7:
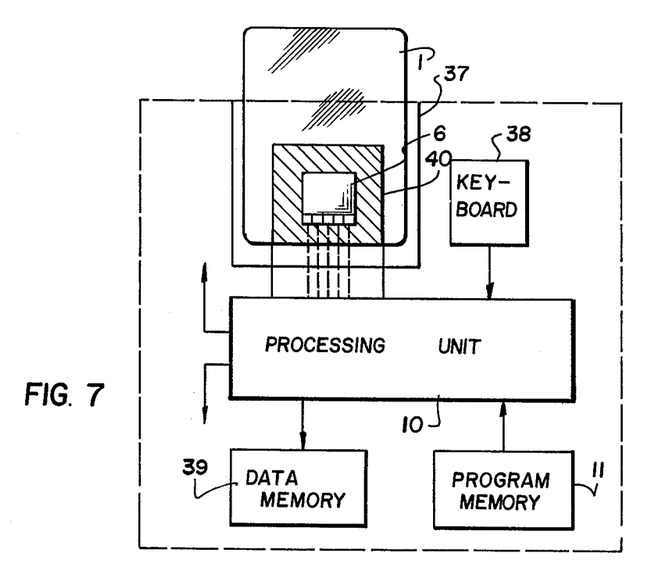
FIG. 7 is a block diagram of an identificand forming part of the system of the present invention and a machine, in which the identificand is inserted, and also embodying the present invention.

FIG. 7 is a block diagram illustrating a machine serving to store transactions in the identificand, and FIG. 8 is a flow chart of the operation of the machine of FIG. 7. The machine shown in FIG. 7 includes, as a checking device, the reader 37 into which the identificand 1 is to be inserted. Reader 37 provides identificand 1 with power and sends data to and receives date from the identificand. The processing unit PU 10, with the program memory 11, in identificand 1, controls the machine. Data input is entered on the built-in keyboard 38.

During the checking operation, messages and alarms can be transmitted outside and, upon completion of the checking process, a "go" signal can be transmitted to the operations part of the machine to effect the desired transaction. Besides the transaction data stored in the identificand, such storage is provided in the machine in data memory 39. This data storage device is either physically transported, at times, to the host computer location and the information contained read out into the host computer for further processing or, in "on-line" operations, is processed by a host computer.

In addition, the machine shown in FIG. 7 contains a checking device 40 which ascertains whether or not there are connections to the outside of the reader or the machine from the area where the IC of the identificand is placed and by which the IC of the identificand is placed on legitimate cards. The system is thus protected against criminals who might try to substitute the essential functions of the IC in the identificand with a simulation circuit composed of discrete components outside the identificand. The identificand also can be confiscated by the machine or otherwise.

Introduction of the identificand into a machine can be arranged in such a manner that, after the identificand is inserted by a user, a flap or cover can be closed, either manually by the user or automatically. The flap or cover is so designed that it can, through a locking action, interrupt or physically cut any possible connections to the identificand. Furthermore, such a flap or cover, combined with a shield surrounding the reader part of the machine, protects the identificand, inserted in the machine, from any connections which do not depend on leads, such as electromagnetic or mechanical waves. This locking device is so designed that the machine can work only when the hinged flap or cover is tightly closed and stops when the flap or cover is open.

Further checking is then done in a manner similar to that employed for the simplified checking devices or verifying means shown in FIGS. 4 and 5, and wherein, the personal identification number or PIN is entered into the machine. The PIN is transmitted into the identificand and then checked internally for conformity.

The identificand transmits merely a conformity/nonconformity signal. If the PIN has been entered incorrectly, it is indicated. The input can be repeated n times. In practice, usually three attempts are allowed. After the nth input, an alarm signal is transmitted, the IC in the identificand is electrically destroyed, and a record of the mistrials is made in the identificand.

If the personal identification number or PIN has been entered correctly, the user identifying data, stored in the memories, will then be transmitted. Likewise, the use and transaction data will be read and stored in the machine. After this data is read from the identificand, the desired transaction can be entered into the machine. All of this is indicated in the flow chart of FIG. 8.

By means of the use and/or transaction data, it is verified whether the desired transaction can be permitted. If the transaction is not allowed or permitted, then a signal will be given to this effect, and a different transaction information has to be entered into the machine. If the transaction is permissible, the transaction data will then be stored in the identificand, in the machine and/or transmitted to the main central processing unit. Following this, a "go" signal is given by the checking device of the machine and the transaction is processed.

In "off-line" operations, the data storage device is exhcanged at given times for empties, and the recorded information is fed into the host computer for processing. As a result, the host computer maintains files on the account of the identificand's owner so that, depending upon the cycles of data storage device exchange, the central office can keep up-to-date records.

It should be understood that the individual elements of the system of the invention, such as identificands, encoders, checking devices and machines, can also be used in other systems. Consequently, the patentable novelty of the present invention resides not only in the invention system but also in the individual elements of the system both per se or in combination.

While specific embodiments of the invention have been shown and described in detail to illustrate the application of the principles of the invention, it will be understood that the invention may be embodied otherwise without departing from such principles.

What is claimed is:

1. In a system, secured against misuse and counterfeiting, for effecting transactions, such as manual or mechanical delivery of commodities, services and money while using identificands, such as credit cards, check cards, cards for automatic machines, coded tokens, keys and the like, provided with identification data, processing data, or both which are readable visually, by a machine, or both, and while using a personal identifying designation, such as a personal identification number (PIN), for verifying the entitlement of the user of the identificand: the improvement comprising, in combination, an identificand having inaccessibly and integrally incorporated therein memories for entry and storage of information therein, including a personal identifying designation; at least the memory for entry and storage of the personal identifying designation being chargeable only once, and at least the contents of the memory for the personal identifying designation being available only within the identificand; verifying means operable to receive said identificand and apply an input thereto; components included in said identificand and activated, responsive to an input from said verifying means, to effect checking of the identity and entitlement of a user of said identificand; and input-output means included in said identificand for establishing communication between said identificand and said verifying means; said identificand including means preventing external access to said memories except through said input-output means when in communication with said verifying means.

2. In a system secured against misuse and counterfeiting, the improvement claimed in claim 1, in which said identificand comprises a processing unit controlling and actuating the storage and processing operations.

3. In a system secured against misuse and counterfeiting, the improvement claimed in claim 2, in which said processing unit comprises a microprocesser controlling and actuating the storage and processing operations.

4. In a system secured against misuse and counterfeiting, the improvement claimed in claim 2, in which said processing unit comprises an electronic control device in which the programs are contained in hard-wired logic.

5. In a system secured against misuse and counterfeiting, the improvement claimed in claim 2, including gates interposed between said processing unit and said memories capable of being automatically destroyed after the allocated data have been entered into said memories for the first time.

6. In a system secured against misuse and counterfeiting, the improvement claimed in claim 1, in which daid personal identifying designation is a personal identification number which can be optional for the entitled owner of the identificand and which can be entered into the memory for entry and storage of the personal identifying designation; said memories including a memory for entry and storage of the identification data and a memory for entry and storage of the conditions of use of the identificand.

7. In a system secured against misuse and counterfeiting, the improvement claimed in claim 2, in which a protective code, in the form of a random number, is entered, during manufacture of the identificand, into a first memory which is chargeable only once and is available only within the identificand, on the one hand, and also, on the other hand, as a readable number into a concealed information carrier; the identificand and the concealed information carrier are separately handled prior to delivery of the identificand to a user; the protective code is read from the concealed information carrier and entered into the identificand wherein it is compared internally with the stored protective code for identity; and, responsive to a positive result of such comparison, a release signal is produced by the processing unit for further processing of the identificand; after which a personal identifying designation, is entered into a second mamory of the identificand.

8. In a system secured against misuse and counterfeiting, the improvement claimed in claim 1, including a read-in gate and a read-out gate interposed between said first memory and said processing unit, and capable of being automatically destroyed following the initial read-in operation and initial read-out operation, respectively.

9. In a system secured against misuse and counterfeiting, the improvement claimed in claim 7, in which said identificand comprises a plurality of sets of said memories for entry and storage of information therein, including a personal identifying designation and securing data; said plurality of said sets of said memories being connected to said processing unit thereby making possible successive re-uses of said identificand by entering thereinto further protective codes and use information data.

10. In a system secured against misuse and counterfeiting, the improvement claimed in claim 2, in which said memories are incorporated in a single integrated circuit with said processing unit.

11. In a system secured against misuse and counterfeiting, the improvement claimed in claim 2, in which said memories are incorporated in respective integrated circuits additional to an integrated circuit containing said processing unit.

12. In a system secured against misuse and counterfeiting, the improvement claimed in claim 2, in which the geometric dimensions of the control electronics, including all the memories and said processing unit, have a predetermined maximum magnitude; said verifying means, upon insertion of an identificand thereinto, checking whether, outside the admissible area defined by these maximum geometric dimensions, there are connections for transmitting signals into or out of said admissible area.

13. In a system secured against misuse and counterfeiting, the improvement claimed in claim 12, in which, responsive to the presence of said connections, said verifying means releases a signal disabling said control electronics.

14. In a system secured against misuse and counterfeiting, the improvement claimed in claim 12, in which, responsive to the presence of said connections, said verifying means releases a signal interrupting further checking operation of said verifying means.

15. In a system secured against misuse and counterfeiting, the improvement claimed in claim 1, in which said verifying means is an automatic machine including a reader into which the identificand is introduced; and screening means interposed between the identificand, in its inserted position, and the environment of said reader, screening the identificand against conduction-independent connections including electromagnetic and mechanical waves.

16. In a system secured against misuse and counterfeiting, the improvement claimed in claim 1, in which said verifying means is an automatic machine including a reader into which the identificand is inserted; and a mechanical closing device included in said machine and operable, responsive to insertion of an identificand into said reader, to interrupt any connections leading from the identificand to the exterior.

17. In a system secured against misuse and counterfeiting, the improvement claimed in claim 1, including protective coatings protecting the components within said identificand against external wave energy.

18. In a system secured against misuse and counterfeiting, the improvement claimed in claim 1, in which the components within said identificand are destroyed responsive to opening of the identificand or peeling of layers thereof.

19. In a system secured against misuse and counterfeiting, the improvement claimed in claim 1, in which, responsive to non-observance of predetermined checking criteria during use of the identificand, the components within said identificand are automatically made inoperable.

20. In a system secured against misuse and counterfeiting, the improvement claimed in claim 1, in which, upon non-observance of checking criteria during use of the identificand, the components within said identificand deliver a signal to said verifying means.

21. In a system secured against misuse and counterfeiting, the improvement claimed in claim 20, in which said verifying means, responsive to the delivery of said signal thereto from said identificand, prevents further functioning of the components within said identificand.

22. For use in a system secured against misuse and counterfeiting, an identificand having inaccessibly and integrally incorporated therein memories for entry and storage of information therein, including a personal identifying designation; at least the memory for entry and storage of the personal identifying designation being chargeable only once, and at least the contents of the memory for the personal identifying designation being available only within the identificand; components included in said identificand and activated, responsive to an input to said identificand, to effect checking of the identity and entitlement of a user of said identificand; and input-output means included in said identificand for establishing communication between said identificand and a verifying means; said identificand including means preventing external access to said memories except through said input-output means when in communication with a verifying means.

23. An identificand, as claimed in claim 22, further comprising a processing unit controlling and actuating the storage and processing operations.

24. An identificand, as claimed in claim 23, including gates interposed between said processing unit and said memories capable of being automatically destroyed after the allocated data have been entered into said memories for the first time.

25. An identificand, as claimed in claim 22, in which said personal identifying designation is a personal identification number which can be optional for the entitled owner of the identificand and which can be entered into the memory for entry and storage of the personal identifying designation; said memories including a memory for entry and storage of the identification data and a memory for entry and storage of the conditions of use of the identificand.

26. An identificand, as claimed in claim 23, in which a protective code, in the form of a random number, is entered, during manufacturing of the identificand, into a first memory which is chargeable only once and is available only within the identificand, on the one hand, and also, on the other hand, as a readable number into a concealed information carrier; the identificand and the concealed information carrier are separately handled prior to delivery of the identificand to a user; the protective code is read from the concealed information carrier and entered into the identificand wherein it is compared internally with the stored protective code for identity; and, responsive to a positive result of such comparison, a release signal is produced by the processing unit for further processing of the identificand; after which a personal identifying designation is entered into a second memory of the identificand.

27. An identificand, as claimed in claim 26, comprising a plurality of sets of said memories for entry and storage of information therein, including a personal identifying designation and securing data; said plurality of said sets of memories being connected to said processing unit thereby making possible successive reuses of said identificand by entering thereinto further protective codes and use information data.

* * * * *